United States Patent Office 2,947,763
Patented Aug. 2, 1960

2,947,763
17α-(1-ALKYNYL)- AND 17α-(1-ALKENYL)-1,3,5(10)-ESTRATRIEN-17β-OLS AND INTERMEDIATES

Arthur H. Goldkamp, Deerfield, Ill., assignor to G. D. Searle & Co., Chicago, Ill., a corporation of Delaware No Drawing. Filed Dec. 17, 1958, Ser. No. 780,920

9 Claims. (Cl. 260—397.3)

This invention relates to 17α-(1-alkynyl)- and 17α-(1-alkenyl)-1,3,5(10)-estratrien-17β-ols and intermediates for preparing same. The 17α-substituted, 17β-ols are represented by the structural formula

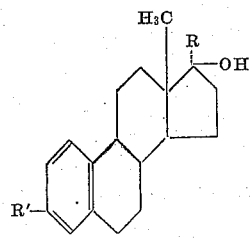

wherein R is selected from the group consisting of lower 1-alkynyl and lower 1-alkenyl radicals and R' is selected from the group consisting of hydrogen and lower alkyl radicals. The lower hydrocarbon radicals included are straight- and branched-chain isomers of those containing less than nine carbon atoms.

The 17α-(1-alkynyl)-1,3,5(10)-estratrien-17β-ols of the present invention are obtained by treating the appropriate 1,3,5(10)-estratrien-17-one with acetylene or an alkyl acetylene in the presence of an alkaline catalyst and isolating the product. For example, treating 3-methyl-1,3,5(10)-estratrien-17-one with acetylene in the presence of potassium tertiary-pentoxide and isolating the product yields 17α-ethynyl-3-methyl-1,3,5(10)-estratrien-17β-ol.

The 17α-(1-alkenyl)-1,3,5(10)-estratrien-17β-ols of the present invention are prepared by treating the corresponding 17α-(1-alkenyl)-compounds with one molecular equivalent of hydrogen in the presence of a hydrogenation catalyst and isolating the product. As a specific example, 17α-(1-propynyl)-1,3,5(10)-estratrien-17β-ol is treated with one molecular equivalent of hydrogen in the presence of a 5% palladium-on-calcium carbonate catalyst and the product isolated to afford 17α-(1-propenyl)-1,3,5(10)-estratrien-17β-ol.

In the group of compounds wherein R' in the generic formula above is hydrogen, the necessary intermediate is 1,3,5(10)-estratrien-17-one. The latter is prepared by a three-step process starting with estradiol. The first step involves the condensation of estradiol with an alkyl phosphorochloridate such as ethyl phosphorochloridate and isolation of the product resulting in an estradiol 3-dialkylphosphate such as estradiol 3-diethylphosphate. Treating the latter with lithium in liquid ammonia and isolating the product affords 1,3,5(10)-estratrien-17-ol. The latter is oxidized with chromic acid to produce the desired ketone, 1,3,5(10)-estratrien-17-one.

The 3-alkyl-1,3,5(10)-estratrien-17-ones, necessary intermediates for the preparation of the 3-alkyl-17α-substituted-17β-ols of this invention, are prepared from 19-nortestosterone by a four-step process. Treating 19-nortestosterone with an appropriate alkyl magnesium bromide and hydrolyzing the resultant addition product followed by isolation of the product affords a mixture of the corresponding epimeric 3-alkyl-estra-4-ene-3,17-diols. The latter mixture is treated with a 10% palladium-on-carbon catalyst in acetic acid and the crude product isolated to afford a mixture of the 3-alkyl-1,3,5(10)-estratrien-17-ol and the acetate thereof. Treating the latter mixture with acetic anhydride in pyridine and isolating the product yields the 17-acetoxy-3-alkyl-1,3,5(10)-estratriene. The latter is treated with a solution of potassium carbonate in aqueous methanol and the product isolated resulting in the 3-alkyl-1,3,5(10)-estratrien-17-ol. Treating the latter with chromic acid and isolating the product yields the desired 3-alkyl-1,3,5(10)-estratrien-17-one. As a specific example, 19-nortestosterone is treated with methyl magnesium bromide and the above process carried out to yield as the final product 3-methyl-1,3,5(10)-estratrien-17-one.

The 17-acetoxy-3-alkyl-1,3,5(10)-estratrienes, 3-alkyl-1,3,5(10)-estratrien-17-ols and 3-alkyl-1,3,5(10)-estratrien-17-ones described in the preceding paragraph are compounds of this invention and are useful as intermediates in the preparation of the 17α-(1-alkynyl)- and 17α-(1-alkenyl)-1,3,5(10)-estratrien-17β-ols of the present invention.

The 17α-(1-alkynyl)- and 17α-(1-alkenyl)-1,3,5(10)-estratrien-17β-ols of the present invention are useful because of their valuable pharmacological properties. They have, for example, the capacity to decrease the serum concentration of cholesterol and the corresponding chloesterol: phospholipid ratio without at the same time producing the potent estrogenic side-effects characteristic of prior art compositions adapted to regulation of cholesterol metabolism.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight and in parts by volume which bear the same relation one to the other as kilograms to liters.

EXAMPLE 1

1,3,5(10)-estratrien-17-one

To a suspension of 30 parts by weight of estradiol in 50 parts by volume of 95% ethanol under nitrogen is added a solution of 7.4 parts by weight of potassium hydroxide in 10 parts by volume of water. To the solution, cooled to 0–5°, is added 21.9 parts by weight of ethyl phosphorochloridate over a period of 5 minutes. The mixture is stirred for 5 minutes longer then poured into 500 parts by volume of ether. The ether solution is washed several times with water, dried over anhydrous sodium sulfate, and stripped of solvent leaving a residue which is recrystallized from an ether-Skellysolve B solution to yield pure estradiol 3-diethylphosphate, M.P. about 113.5–115°.

To a solution of 50 parts by weight of estradiol 3-diethylphosphate in 40 parts by volume of anhydrous ether and 300 parts by volume of liquid ammonia is added approximately 1.7 parts by weight of lithium in small portions. At this point a persistent blue color has been attained. After the ammonia is allowed to evaporate, ether is added, the ether solution washed successively with water, 10% sulfuric acid, Claisen's alkali, and water, and dried over anhydrous sodium sulfate. Evaporation of the ether and recrystallization of the residue from an ether-Skellysolve A solution yields 1,3,5(10)-estratrien-17β-ol, M.P. about 117.5–119°. $[\alpha]_D = 89.7°$ (in chloroform). It has maxima in the ultra-violet at about 273.5 and 266 millimicrons with molecular extinction coefficients of approximately 514 and 501, respectively.

To a cold, efficiently stirred solution of 4 parts by weight of 1,3,5(10)-estratrien-17β-ol in 40 parts by volume of acetone is added 5 parts by volume of an aqueous solution containing 1.34 pars by weight of chromium trioxide and 2.1 parts by weight of concentrated sulfuric acid over a period of about 3 minutes. Dilution of the reaction mixture with 400 parts by volume of water with cooling results in precipitation of the product which is removed by filtration. Recrystallization from methanol yields 1,3,5(10)-estratrien-17-one, M.P. about 142–144°, which exhibits, in the ultra-violet, maxima at about 273 and 266 millimicrons with molecular extinction coefficients of approximately 504 and 533, respectively.

EXAMPLE 2

17β-acetoxy-3-methyl-1,3,5(10)-estratriene

A solution of 6 parts by weight of 19-nortestosterone in 20 parts by volume of tetrahydrofuran is diluted with 45 parts by volume of ether. The resulting solution is added dropwise over a period of 1½ hours to 60 parts by volume of a rapidly stirred, refluxing 3M ethereal solution of methyl magnesium bromide. The excess methyl magnesium bromide is destroyed by pouring the reaction mixture onto cracked ice. The ether layer is separated, washed with saturated ammonium chloride solution, dried over anhydrous sodium sulfate and evaporated to dryness to afford a mixture of epimeric 3-methyl-estra-4-ene-3,17-diols.

A mixture of 6.5 parts by weight of the epimeric diols with 50 parts by volume of glacial acetic acid and 2 parts by weight of 10% palladium-on-carbon is heated at reflux with stirring for 30 minutes then the reaction mixture cooled and filtered. The filtrate is evaporated to dryness in vacuo leaving a residue containing 3-methyl-1,3,5(10)-estratrien-17β-ol and its acetate. To this crude residue is added 10 parts by volume of pyridine and 7.5 parts by volume of acetic anhydride and the solution heated on the steam bath for 2 hours. The reaction mixture is cooled and diluted with water and the resultant precipitate collected by filtration. Recrystallization from methanol yields 17β-acetoxy-3-methyl-1,3,5(10)-estratriene, M.P. about 125.5–128°. Its ultra-violet absorption spectrum has maxima at 269 and 278 millimicrons with molecular extinction coefficients of 712 and 807, respectively.

By substituting an equivalent quantity of n-butyl magnesium bromide and otherwise proceeding according to the herein described processes 17β-acetoxy-3-n-butyl 1,3,5(10)-estratriene is obtained. It possesses maxima in the infrared at about 5.79, 6.67 and 7.93 microns.

EXAMPLE 3

3-methyl-1,3,5(10)-estratrien-17β-ol

To a refluxing suspension of 10 parts by weight of 17β-acetoxy-3-methyl-1,3,5(10)-estratriene in 100 parts by volume of methanol is added a solution of 10 parts by weight of potassium carbonate in 25 parts by volume of water and refluxing continued for 1½ hours. The reaction mixture is cooled and diluted with 900 parts by volume of water and the resultant precipitate collected by filtration. Recrystallization from aqueous methanol then from methanol yields a solvate of 3-methyl-1,3,5-(10)-estratrien-17β-ol, M.P. 61–70°. It possesses maxima in the ultra-violet at 269 and 278 millimicrons with molecular extinction coefficients of 730 and 811, respectively.

By substituting an equivalent quantity of 17β-acetoxy-3-n-butyl-1,3,5(10)-estratriene and otherwise proceeding according to the herein described processes, 3-n-butyl-1,3,5(10)-estratrien-17β-ol is obtained. Its infrared absorption spectrum exhibits maxima at 2.75, 6.64, and 10.4 microns.

EXAMPLE 4

3-methyl-1,3,5(10)-estratrien-17-one

To a solution of 7 parts by weight of 3-methyl-1,3,5-(10)-estratrien-17β-ol in 100 parts by volume of acetone cooled by means of an ice-bath, is added 7.1 parts of an aqueous solution containing 1.9 parts by weight of chromium trioxide and 2.95 parts by weight of concentrated sulfuric acid over a period of 2 minutes with vigorous stirring. The reaction mixture is diluted with 900 parts by volume of water with cooling and the crude product collected by filtration. Purification is effected by dissolution in benzene and successive washing of the resultant solution with 5% sodium carbonate, 10% hydrochloric acid, and water. Distillation of the benzene then recrystallization of the residue from a methylene chloride-methanol solution produces 3-methyl-1,3,5(10)-estratrien-17-one, M.P. about 179–182.5°. Its ultra-violet absorption spectrum has maxima at 269 and 278 millimicrons with molecular extinction coefficients of 703 and 816, respectively.

By substituting an equivalent quantity of 3-n-butyl-1,3,5(10)-estratrien-17β-ol and otherwise proceeding according to the herein described processes, 3-n-butyl-1,3,5(10)-estratrien-17-one is obtained. It exhibits maxima in the infrared at 5.75, 6.64, and 9.9 microns.

EXAMPLE 5

17α-ethynyl-1,3,5(10)-estratrien-17β-ol

A mixture of 4 parts by weight of potassium and 50 parts by volume of tertiary-amyl alcohol is heated at reflux under nitrogen until solution is complete. The cooled solution is diluted with 15 parts by volume of anhydrous ether, then saturated with acetylene with stirring. To this solution is added 3 parts of 1,3,5(10)-estratrien-17-one and acetylene addition is continued for 8 hours. This mixture is allowed to stand at 0–5° for approximately 16 hours, then treated with 100 parts by volume of saturated aqueous ammonium chloride with stirring. This mixture is transferred with the aid of 500 parts by volume of ether to a separatory funnel and the aqueous layer discarded. The ether layer is washed successively with water, 10% hydrochloric acid, and water, and then dried over anhydrous sodium sulfate. Evaporation of the ether leaves a residue which is purified by chromatography on approximately 300 parts by weight of silica gel using benzene or a benzene-Skellysolve B solution as the eluant. Further purification is effected by recrystallization from an ether-Skellysolve A solution which yields the pure 17α-ethynyl-1,3,5(10)-estratrien-17β-ol, M.P. about 123.5–125.5°. In chloroform solution it has maxima in the infra-red at about 2.76, 3.02, 6.22, and 6.69 microns.

EXAMPLE 6

3-n-butyl-17α-(1-propynyl)-1,3,5(10)-estratrien-17β-ol

A mixture of 3 parts by weight of 3-n-butyl-1,3,5(10)-estratrien-17-one in 200 parts by volume of liquid ammonia and 1 part by weight of sodamide is saturated with dry propyne. Propyne addition is continued with stirring for 4 hours after which time 5 parts by volume of saturated ammonium chloride solution is added slowly and the mixture allowed to stand at room temperature until most of the ammonia is evaporated. To the residue is added 200 parts by volume of benzene and 100 parts by volume of water with stirring. The benzene layer is separated, washed with water, dried over anhydrous sodium sulfate, and evaporated to dryness in vacuo. This residue is chromatographed over 300 parts by weight of silica gel then crystallized from aqueous methanol to produce 3-n-butyl-17α-(1-propynyl)-1,3,5(10)-estratrien-17β-ol. Its infrared absorption spectrum exhibits maxima at 2.76, 6.2, and 6.64 microns.

EXAMPLE 7

17α-ethynyl-3-methyl-1,3,5(10)estratrien-17β-ol

A solution of potassium tertiary-pentoxide is prepared by dissolving 4 parts by weight of potassium in 50 parts by volume of boiling tertiary-amyl alcohol under nitrogen. The above solution is cooled, diluted with 15 parts by volume of anhydrous ether, and saturated with acetylene with stirring. To this solution is added 3 parts by weight of 3-methyl-1,3,5(10)-estratrien-17-one and acetylene addition continued with stirring for 5 hours while the temperature is kept at 0–5°. Acetylene addition is discontinued and the reaction mixture allowed to stand at 0–5° for 16 hours. While the mixture is stirred vigorously 100 parts by volume of saturated ammonium chloride solution and 300 parts by volume of benzene are added. The benzene layer is separated, washed with 5% hydrochloric acid and water, dried over anhydrous sodium sulfate, and evaporated to dryness in vacuo. The residue is purified by chromatography over 300 parts by weight of silica gel followed by recrystallization from aqueous methanol resulting in 17α-ethynyl-3-methyl-1,3-5(10)-estratrien-17β-ol, M.P. about 123.5–125.5°. It exhibits maxima in the ultra-violet at 269 and 278 millimicrons with molecular extinction coefficients of 704 and 809, respectively. Its infrared spectrum possesses maxima at about 2.75, 3.01, 6.2, and 6.62 microns (chloroform solution).

EXAMPLE 8

17α-vinyl-1,3,5(10)-estratrien-17β-ol

A mixture of 1 part by weight of 17α-ethynyl-1,3,5(10)-estratrien-17β-ol dissolved in 14 parts by volume of pyridine with 0.2 part by weight of 5% palladium-on-calcium carbonate catalyst is stirred in a hydrogen atmosphere until one molecular equivalent of hydrogen is absorbed. The catalyst is removed by filtration and the filtrate evaporated to dryness in vacuo. The residue is chromatographed over silica gel and the product obtained by elution with a 70% benzene-30% Skellysolve B solution. Further purification by recrystallization from Skellysolve B yields 17α-vinyl-1,3,5(10)-estratrien-17β-ol, M.P. about 109–111°. Its infrared spectrum has maxima at about 2.75, 10.0, and 10.8 microns.

By substituting an equivalent quantity of 3-n-butyl-17α-(1-propynyl)-1,3,5(10)-estratrien-17β-ol and otherwise proceeding according to the herein described processes 3-n-butyl-17α-(1-propenyl)-1,3,5(10)-estratrien-17β-ol is obtained. It exhibits maxima in the infrared at 2.73, 6.2, and 6.64 microns.

EXAMPLE 9

3-methyl-17α-vinyl-1,3,5(10)estratrien-17β-ol

A mixture of 1 part by weight of 17α-ethynyl-3-methyl-1,3,5(10)-estratrien-17β-ol dissolved in 20 parts by volume of pyridine with 0.2 part by weight of 5% palladium-on-calcium carbonate catalyst is stirred in a hydrogen atmosphere until one molecular equivalent of hydrogen is absorbed. The catalyst is removed by filtration and the filtrate evaporated to dryness in vacuo yielding a residue which is purified by chromatography over silica gel and crystallization from Skellysolve B to afford 3-methyl-17α-vinyl-1,3,5(10)-estratrien-17β-ol, M.P. about 95–96°.

What is claimed is:
1. A compound of the structural formula

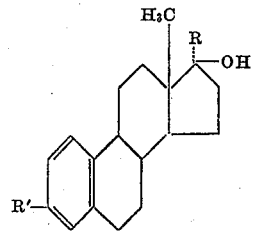

wherein R is selected from the group consisting of lower 1-alkynyl and lower 1-alkenyl radicals and R' is selected from the group consisting of hydrogen and lower alkyl radicals.
2. 17α-ethynyl-1,3,5(10)-estratrien-17β-ol.
3. 17α-vinyl-1,3,5(10)-estratrien-17β-ol.
4. 17α-ethynyl-3-methyl-1,3,5(10)-estratrien-17β-ol.
5. 3-methyl-17α-vinyl-1,3,5(10)-estratrien-17β-ol.
6. 3-n-butyl-17α-(1-propynyl)-1,3,5(10)-estratrien-17β-ol.
7. 17β-acetoxy-3-methyl-1,3,5(10)-estratriene.
8. 3-methyl-1,3,5(10)-estratrien-17β-ol.
9. 3-methyl-1,3,5(10)-estratrien-17-one.

References Cited in the file of this patent
UNITED STATES PATENTS

| | | |
|---|---|---|
| 2,666,769 | Colton | Jan. 19, 1954 |
| 2,744,122 | Djerassi et al. | May 1, 1956 |
| 2,841,598 | Hewitt | July 1, 1958 |